(12) United States Patent
Frusina et al.

(10) Patent No.: US 8,873,560 B2
(45) Date of Patent: Oct. 28, 2014

(54) MULTIPATH VIDEO STREAMING OVER A WIRELESS NETWORK

(75) Inventors: Bogdan Frusina, Kitchener (CA); Akos Horvath, Kitchener (CA)

(73) Assignee: Dejero Labs Inc., Waterloo, Ontario (CA)

(*) Notice: Subject to any disclaimer, the term of this patent is extended or adjusted under 35 U.S.C. 154(b) by 418 days.

(21) Appl. No.: 12/499,151

(22) Filed: Jul. 8, 2009

(65) Prior Publication Data
US 2011/0007693 A1 Jan. 13, 2011

(51) Int. Cl.
| | | |
|---|---|---|
| *H04L 12/28* | (2006.01) | |
| *H04N 21/2343* | (2011.01) | |
| *H04N 21/6373* | (2011.01) | |
| *H04N 21/44* | (2011.01) | |
| *H04L 5/00* | (2006.01) | |
| *H04N 21/462* | (2011.01) | |
| *H04N 21/61* | (2011.01) | |
| *H04N 21/6377* | (2011.01) | |
| *H04N 21/63* | (2011.01) | |
| *H04N 21/658* | (2011.01) | |
| *H04N 21/234* | (2011.01) | |

(52) U.S. Cl.
CPC ............ *H04L 5/003* (2013.01); *H04N 21/2343* (2013.01); *H04N 21/6373* (2013.01); *H04N 21/44004* (2013.01); *H04N 21/4622* (2013.01); *H04N 21/6131* (2013.01); *H04N 21/6377* (2013.01); *H04N 21/631* (2013.01); *H04N 21/658* (2013.01); *H04L 5/0058* (2013.01); *H04L 5/0053* (2013.01); *H04N 21/23406* (2013.01)
USPC .............................. 370/394; 370/401; 370/412

(58) Field of Classification Search
USPC .............. 370/230, 230.1, 231, 232, 233, 234, 370/235, 236, 236.2, 237, 238
See application file for complete search history.

(56) References Cited

U.S. PATENT DOCUMENTS

| | | | |
|---|---|---|---|
| 6,834,044 B2 | 12/2004 | Sugirtharaj et al. | |
| 2003/0185249 A1* | 10/2003 | Davies et al. | 370/535 |

(Continued)

FOREIGN PATENT DOCUMENTS

EP 1748655 A2 1/2007

OTHER PUBLICATIONS

Chi-Yuan et al.; "Rate Control for Robust Video Transmission over Burst-Error Wireless Channels"; IEEE Journal on Selected Areas in Communication; vol. 17 No. 5; May 1, 1999; Piscataway, New Jersey, U.S.A.

(Continued)

*Primary Examiner* — Alvin Zhu
(74) *Attorney, Agent, or Firm* — Norton Rose Fulbright Canada LLP

(57) ABSTRACT

The method and system as disclosed relates to streaming of large quantities of time critical data over multiple distinct channels from a wireless communications device to a central receiver. More specifically the disclosure deals with the challenges and problems of maintaining consistent data reception quality when faced with the anomalies of a moving sender that is sending data using a relatively unstable radio frequency (RF) method. This is achieved by converting single source data into multiple data streams, placing them in transport buffers and storing them for forwarding. A plurality of radio frequency modules provide wireless connectivity to a plurality of wireless network. Links are maintained to provide feedback on network connections to allow for the transfer of data from one network to another and to adjust the amount of data being transmitted.

17 Claims, 8 Drawing Sheets

(56) References Cited

U.S. PATENT DOCUMENTS

| | | | |
|---|---|---|---|
| 2004/0016000 | A1 | 1/2004 | Zhang et al. |
| 2005/0060421 | A1* | 3/2005 | Musunuri et al. ............. 709/231 |
| 2005/0180415 | A1* | 8/2005 | Cheung et al. ................ 370/389 |
| 2005/0210515 | A1* | 9/2005 | Roh et al. ......................... 725/81 |
| 2007/0177579 | A1* | 8/2007 | Diethorn et al. ............. 370/352 |
| 2007/0178932 | A1* | 8/2007 | Miklos et al. ................. 455/525 |
| 2010/0082810 | A1* | 4/2010 | Patel et al. .................... 709/225 |
| 2010/0192212 | A1* | 7/2010 | Raleigh ............................. 726/7 |

OTHER PUBLICATIONS

European Patent Office; EPO Form 1507N—Extended European Search Report dated Jun. 8, 2011; European patent application No. 10168544.4; Munich, Germany.

Yang Lui; Rui Zhou; Huijuan Cui; Kun Tang; "Bi-Directional Entire Frame Recovery in MDC Video Streaming"; Communications and Information Technology, 2005. International Symposium; IEEE International Symposium, Oct. 12-14, 2005; pp. 1023-1026; v2; Beijing, China.

Van Dyck, R.E., Miller, D.J., "Transport of Wireless Video Using Separate, Concatenated, and Joint Source-Channel Coding"; IEEE Journal magazine; Oct. 1999; pp. 1734-1750; v.87 i10, PA, USA.

Manish Jain, Dovrolis, Constantine; "Path Selection Using Available Bandwidth Estimation on in Overlay-based Video Streaming"; Computer Networks, Aug. 22, 2008, pp. 2411-2418, v.52 i.12, Telchemy Inc., U.S.A.

Manish Jain, Dovrolis, Constantine; "Path Selection Using Available Bandwidth Estimation in Overlay-Based Video Streaming", Lecture Notes in Computer Science—Networking 2007. Ad Hoc and Sensor Networks, Wireless Networks, Next Generation Internet; pp. 628-639; v.4479/2009; Springer Berlin/Heidelberg.

Toufik Ahmed, Mubashar Mushtaq; "P2P Object-based adaptive Multimedia Streaming (POEMS)"; Journal of Network and Systems Management; Sep. 2007; pp. 289-310; v15, n3, Springer, New York; NY USA.

Maria G. Martini, Matteo Mazzotti, Catherine Lamy-Bergot, Jyrki Huusko, Peter Amon; "Content Adaptive Network Aware Joint Optimization of Wireless Video Transmission"; Communications Magazine, IEEE, Jan. 2007; pp. 84-90;v45, i1; Toronto, Ontario, Canada.

Batra, Pankaj; Chang, Shih-Fu; "Effective Algorithms for Video Transmission over Wireless Channels" Signal processing. Image communication, V 12, Issue 12, Apr. 1998, pp. 147-166 Elsevier, Amsterdam.

Budagavi, M.; Gibson, J.D. "Multiframe Video Coding for Improved Performance over Wireless Channels" Image Processing, IEEE Transactions, v. 10, Issue 2, Feb. 2001 pp. 252-265, Dallas Texas USA.

Network-Adaptive Scalable Video Streaming over 3g Wireless Network, Image Proceedings, 2001 International Conference Oct. 7-10, 2001, v. 3, pp. 579-582, Thessaloniki, Greece.

Wang, Tu-Chih; Fang, Hung-Chi; Chen, Liang-Gee, "Low-Delay and Error-Robust Wireless Video Transmission for Video Communications", IEEE transactions on circuits and systems for video technology, v. 12, issue 12, Dec. 2002, pp. 1049-1058, New York, NY, USA.

Tesanovic, Milos; Bull, David R.; Doufexi, Angela; Nix, Andrew, "Enhanced MIMO Wireless Video Communication using Multiple-Description Coding", Image Communication, v.23, issue 4, Apr. 2008, pp. 325-336, New York, NY, USA.

European Patent Office, Communication and extedned European search report dated Jun. 8, 2011, issued on European Patent Application No. 10168544.4.

Chi-Yuan Hsu et al., "Rate Control for Robust Video Transmission Over Burst-Error Wireless Channels", IEEE Journal on Selected Areas in Communication, May 1999, vol. No. 17, Issue No. 5.

Zacco Denmark A/S, Response dated Apr. 23, 2012 regarding extended European search report, submitted on European Patent Application No. 10168544.4.

European Patent Office, Communication pursuant to Article 94(3) EPC dated May 24, 2012, issued on European Patent Application No. 10168544.4.

Nguyen, Thinh and Zakhor, Avideh, "Multiple Sender Distributed Video Streaming", IEEE Transactions on Multimedia, Apr. 2004, vol. No. 6, Issue No. 2.

Zacco Denmark A/S, Response dated Nov. 30, 2012 regarding the Communication pursuant to Article 94(3) EPC, submitted on European Patent Application No. 10168544.4.

European Patent Office, Communication pursuant to Article 94(3) EPC dated Sep. 24, 2013, issued on European Patent Application No. 10168544.4.

Zacco Denmark A/S, Response to the Communication pursuant to Article 94(3) EPC dated Sep. 24, 2013 submitted on European Patent Application No. 10168544.4.

* cited by examiner

MULTIPATH VIDEO STREAMING OVER A WIRELESS NETWORK

FIELD OF THE INVENTION

The technology within this disclosure generally relates to streaming of large quantities of time critical data over multiple distinct channels from a wireless communications device to a central receiver. More specifically the disclosure deals with the challenges and problems of maintaining consistent data reception quality when faced with the anomalies of a moving sender that is sending data using a relatively unstable radio frequency (RF) method. In particular the delivery of audio and video data from a wireless transmitter to a fixed receiver presents problems which this disclosure addresses.

BACKGROUND OF THE INVENTION

Delivery of large quantities of time critical data from a wireless transmitter creates a unique set of problems. Examples of time critical data that is generated in large quantities can include audio and video data, multimedia data, simulation data, logging data and others. When the term video transmission or multimedia data is used in this application it will refer to both video and audio transmissions together. Multimedia could also include gesture data, motion data as is used by remote robot control for computer-assisted operations on patients. In the world of large quantity time critical data the majority of solutions are focused on delivery of data transmissions to wireless receivers, not from wireless transmitters. Typically time critical data becomes irrelevant if it does not reach its intended destination in seconds or subseconds. When transmitting over wireless networks the ability to achieve this goal is extremely difficult.

Typically these wireless enabled devices include: wireless PDAs, Smartphones and laptops with tethered RF receivers. Utilizing RF signals through a wireless network is well known including systems such as: General Packet Radio Service (GPRS), Enhanced Data GSM Environment (EDGE), Universal Mobile Telecommunications System (UMTS), Wideband Code Division Multiple Access (W-CMDA) or many other third generation or fourth generation solutions. Other wireless receivers include Wireless Local Area Network (WLAN) products that are based on the Institute of Electrical and Electronics Engineers' (IEEE) 802.11 standards (WiFi) receivers, or a newer class of wireless technologies called Worldwide Interoperability for Microwave Access (Wi-MAX) and Long Term Evolution (LTE) solutions that offer even greater throughputs to solve problems such as television on demand and video conferencing on demand. All of the above solutions fail to deal with the problem of wireless transmitters that transmit large volumes of data that is also time critical, for example data transmissions of either normal definition (720 by 576), high definition (1920 by 1080), or ultra high definition (7680 by 4320) video transmissions. The major limitation of all current radio technologies is the up-channel, leaving the mobile communication device, is typically smaller than the down-channel, arriving at the mobile communication device. With this kind of unbalanced data throughput the ability to transmit large volumes of time critical data on the up-channel is a very difficult problem.

In the field of data communications it is known that multiple data channels can be used to augment data throughput and solve some problem of delivering reliable, high quality data transmissions, such as video data. The paper "Distributed Video Streaming with Forward Error Correction", by Thinh Nguyen and Avideh Zakhor; proposes one such method. An approach known in this field includes opening multiple paths and adjusting data rates based on the throughput actually reaching the receiver. This approach typically focuses on extremely specific calculations to maximize efficiency and Forward Error Correction (FEC) through a control channel to adjust the data rates per channel. These types of solutions generally fail over wireless network topologies as a result of the many anomalies that abound in a wireless medium. Moving wireless transmitters experience problems such as dynamic fading, dead zones, dramatic latency differences, echo effects, the ability to receive but not transmit data, RF interference, immediate channel loss and channel re-allocation to voice only cell phone users.

In accordance with the problems described above a system and method of using multiple paths to solve the problem of streaming large volume data transmission over a wireless network is disclosed.

BRIEF DESCRIPTION OF THE DRAWINGS

Embodiments of the present invention will now be described, by way of example only, with reference to the attached Figures, wherein.

DETAILED DESCRIPTION

Figure 1:
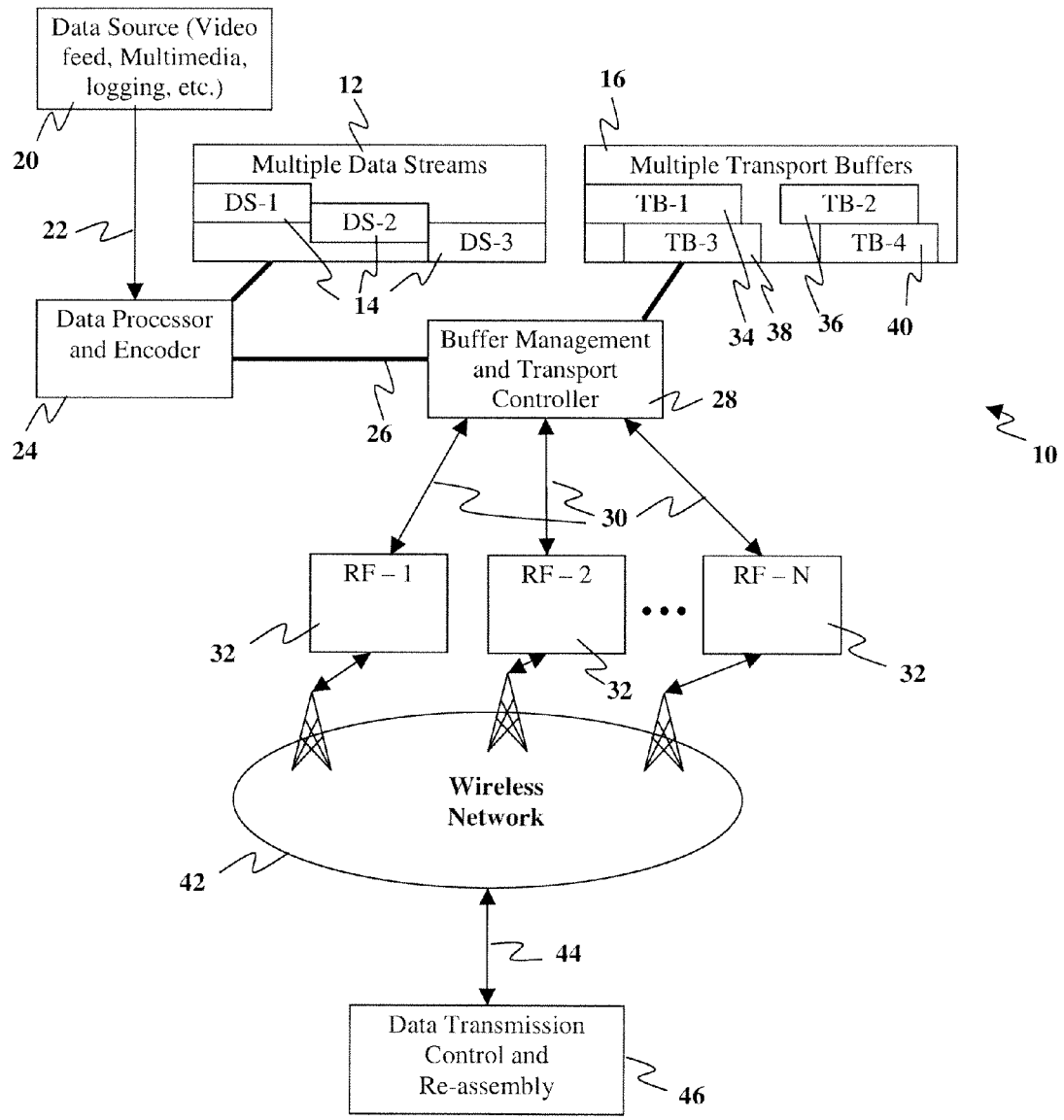
FIG. 1 is a block diagram of an exemplary system with a single wireless network.

FIG. 1 is a block diagram of an exemplary system 10 with a single wireless network. An exemplary us is in environments where there are large quantities of data that must be delivered quickly with a need for mobility and a non-fixed origin for the data. An example of this would be in the news and broadcasting industry where information must be captured quickly and immediately a mobile video camera requires advanced methods for delivery of content to a central location. The most common of these situations includes live action news coverage cameras that are currently connected to satellite trucks costing hundreds of thousands of dollars to build and outfit. These costs are prohibitive for smaller news centers and a cellular-based method is ideally suited for delivering such live news content.

In the exemplary system 10, the Data Source 20 exists for capturing data such as video feeds, multimedia data, and logging. When Data Source 20 is video and audio based it could include normal, high, or extremely high definition audio and video content. When the Data Source 20 is multimedia it could include audio, video, pictures, commands, voice data, television signals and other advanced digital content. Depending on the type of Data Source 20, the data stream 22 will use a well-known coupling known to the field of the Data Source 20 type. For example, when the Data Source 20 is audio and video content an analog and digital camera will be used and will follow standard connection methods such as Serial Digital Interface (SDI), composite video interface or firewire (standard IEEE 1394) for example.

This data stream 22 is directed to a Data Processor and Encoder 24. In an exemplary environment the Data Processor and Encoder 24 would contain one or more high power computer processors and additional graphic processing chips for high-speed operation. Depending on the type of data stream 22, content several advanced encoding methods could be used on the data. The encoding methods could include compression techniques, encryption techniques and multiple descriptive encoding (MPC) techniques to name just a few. When the data stream 22 is a audio and video data stream one of the first steps for the Data Processor and Encoder 24 is to encode the audio and video stream 22 using a standard compression encoding method such as MPEG-4 or the like. For other types of data other compression, encoding or encryption could be used on the data. A subsequent step will be to divide the data stream 22 into Multiple Data Streams 12. The goal of this division is to achieve wireless delivery of Multiple Data Streams 12 to the Data Transmission Control and Re-assembly 46, the data transmission control and re-assembly 46 being also known as a receiver.

As mentioned when dealing with audio and video data after a compression method such as MPEG-4 is first used, the Data Processor and Encoder 24 follows a standard method to split the audio and video into different Data Streams 14. When working with audio and video data there are several standard methods for doing this splitting, for example by using multiple descriptive coding (MDC). Within the MDC splitting method there are many different algorithms that could be used to achieve the splitting of a single data stream 22 into Multiple Data Streams 12, one such algorithm is called Polyphase Down Sampling. Other types of data splitting algorithms could be used to achieve similar results. These multiple data streams 12 are fed into the Buffer Management and Transport Controller 28 over a link 26. This link 26 could be direct link, for example over a computer Bus, a shared memory or other fast internal method or over an external method such as firewire link, a Universal Serial Bus (USB) link, a serial connection, Bluetooth or WiFi wireless link or some other high speed link. In a fully integrated system the Data Processor and Encoder 24 could co-exist with the Buffer Management and Transport Controller 28 in the same physical housing.

The Buffer Management and Transport Controller 28 acts as the main interface to a variable number of Radio Frequency (RF) interface modules 32 (RF Interface module). These are coupled by feature 30 to the Buffer Management and Transport Controller 28 using a standard method such as Universal Serial Bus (USB), serial link, Personal Memory Card International Association (PCMCIA) or direct motherboard bus connection. In FIG. 1 the RF Interface Modules are illustrated as RF features (32). Some of the functions of the Buffer Management and Transport Controller 28 include receiving the encoded Data Streams (DS) 14 and buffering them into Multiple Transport Buffers 16 based on complex logic and ensuring that all Transport Buffers (TB) 34, 36, 39 and 40 make it through the RF Interface Modules 32, over a Wireless Network 42 to the Data Transmission Control and Re-assembly component 46. Such transmissions of data using radio frequency (RF) transmissions are well known in the field of data communications. Methods for exchanging RF signals through a Wireless Network 42 are well known with many available systems as discussed in the background of this disclosure. On the server side of the Wireless Network 42 there are well known land-based methods 44 for connecting to Wireless Networks 42. Today these connection methods typically are TCP/IP based, but it is also well known to use IP alone and to use sessionless methods such as UDP over IP to create faster datagram-based delivery methods. Connection methods 44 may also include X.25 packet switched networks and asynchronous dial-up lines. Most advanced data delivery systems use UDP/IP methods over wireless and create their own transport hand-shaking methods to better customize the delivery of information in the harsh wireless environment. It has been well documented that using unmodified TCP over wireless networks creates another set of delivery problems. Several optimized TCP protocols have been created to make TCP more forgiving and better adapted.

As with all wireless transmissions, general failures occur frequently for a variety of reasons. In an exemplary environment the divided Transport Buffers (TP) 34, 36, 38 and 40 allows the Buffer Manager and Transport Controller 28 the ability to make use of many connected RF Interface Modules 32. Each of these RF Interface Modules 32 offers a unique ability to monitor, control and utilized data throughput based on complex wireless network 42 conditions.

Figure 2:
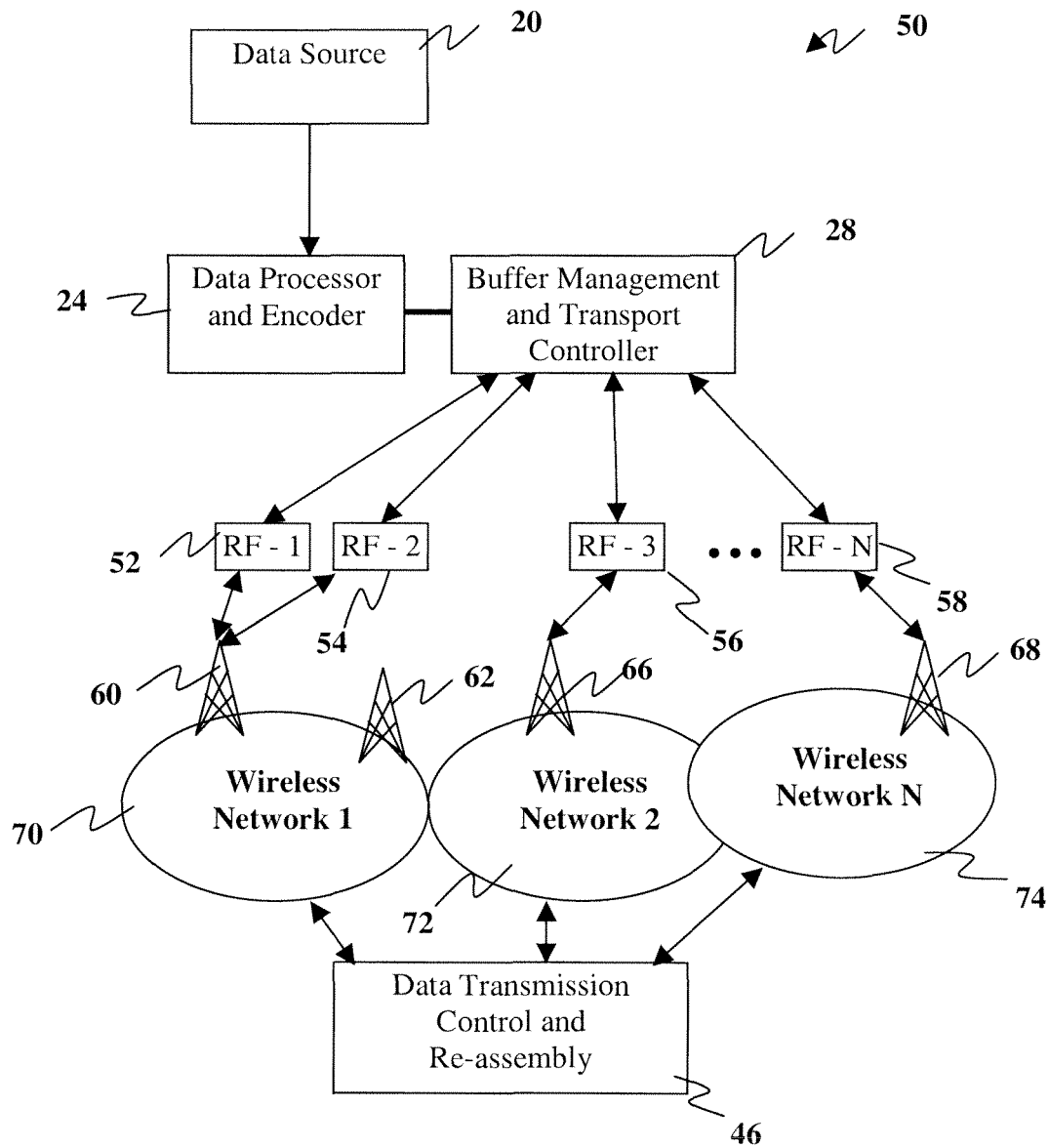
FIG. 2 is a block diagram of an exemplary system with multiple wireless networks.

FIG. 2 is a block diagram of an exemplary system 50 with multiple wireless networks. In this embodiment the Data Processor and Encoder 24 act to encode and divide data transmission from a Data Source 20. The Buffer Management and Transport Controller 28 has further extensions to support a wider range of RF Interface Modules 52, 54, 56 and 58. In this extended environment the RF Interface Modules 52, 54, 56 and 58 are located across a plurality of Wireless Networks 70, 72 and 74. These Wireless Networks 70, 72 and 74 could include one or more similar wireless network types, such as two GSM EDGE networks, or they could all be unique. Wireless networks 70, 72, 74 use a plurality of base stations 60, 62, 66, 68 to solve coverage and capacity issues. In many cases there can be dramatic overlapping of coverage footprints between two base stations to assist in higher density regions, such as a downtown area of a large city. One specific network is granted several frequencies and so two base stations can share a common space while being separated on different frequencies. Similarly competing networks can have overlapping base stations on different frequencies to support different customers, each offering their own set of features and problems. It is these overlapping base station coverage regions can be useful for sending large amounts of data using the advanced methods taught in this disclosure.

Figure 7:
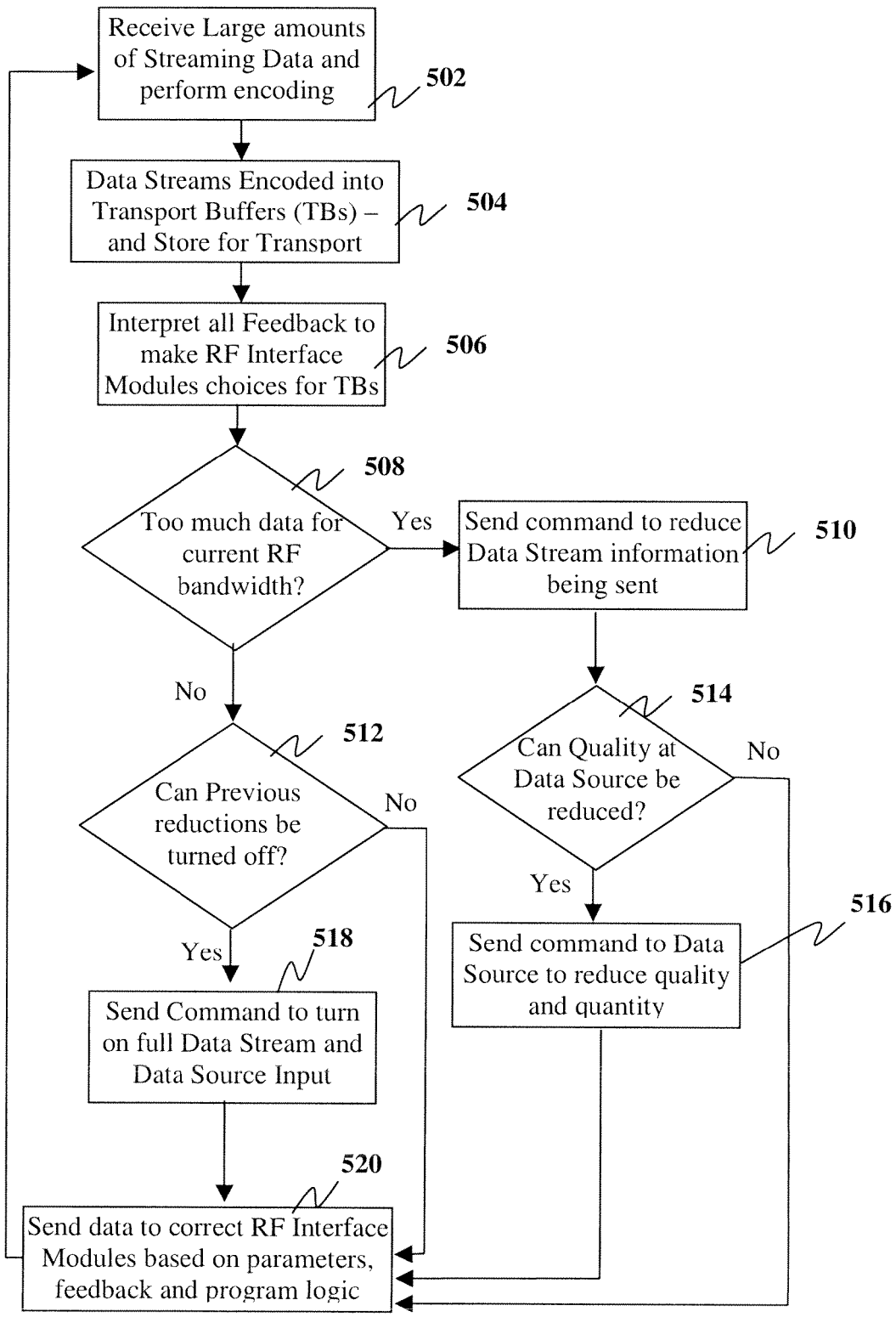
FIG. 7 is a flow chart illustrating the flow of data from the mobile source to the destination.
Figure 8:
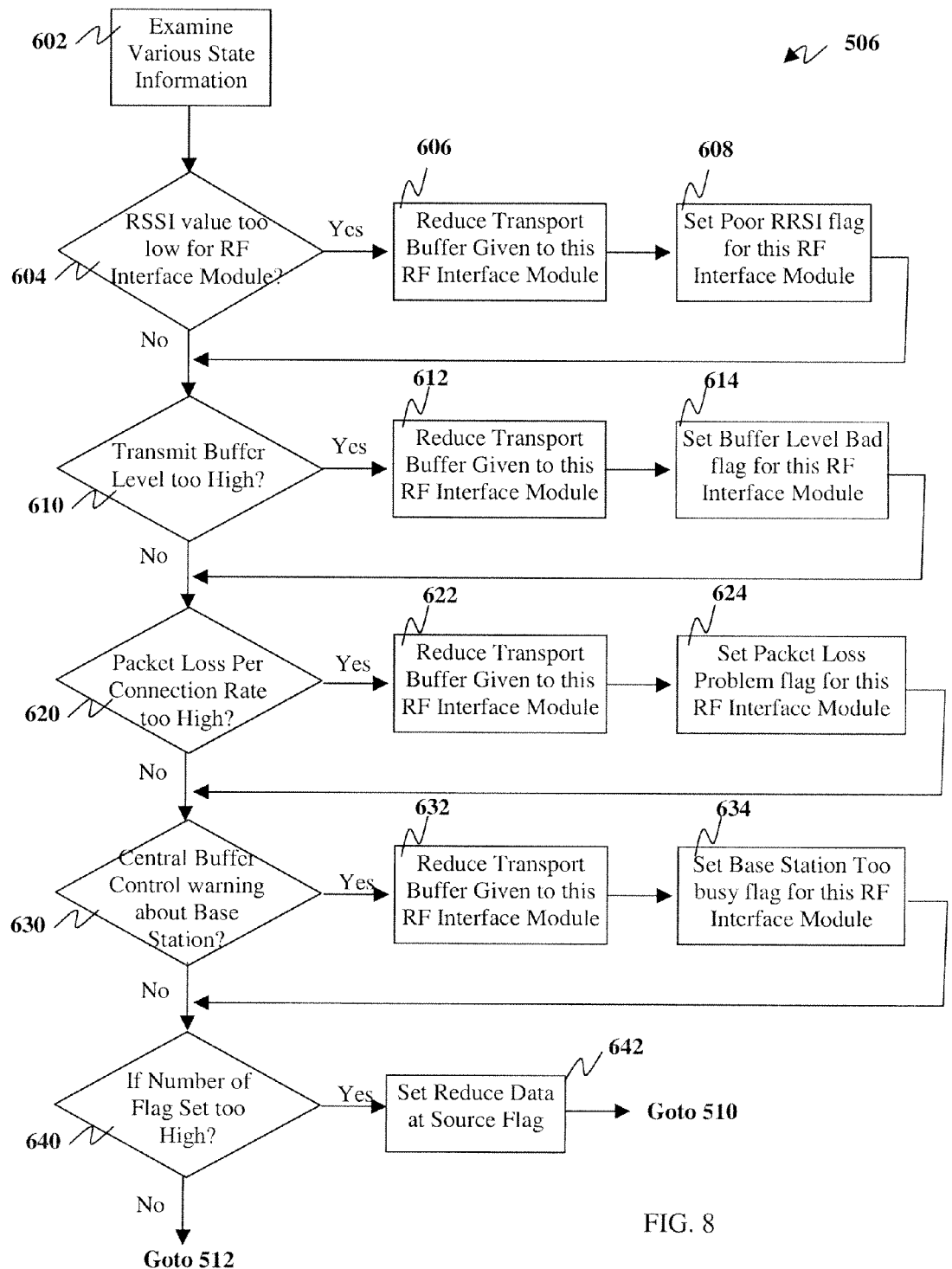
FIG. 8 is a flow chart illustrating the flow of data to determine which paths to use for delivery to a destination.

In this environment the alternatives for delivering Transport Buffers 34, 36, 38 and 40 is enhanced, which provides for many alternatives for solving Wireless Network 70, 72 and 74 issues. For example base station 60 might become busy and congested and Transport Buffers 34, 36, 38 and 40 might slow down dramatically waiting for wireless spectrum to become available. The Buffer Management and Transport Controller 28 might then request that RF Interface Module 54 to move from base station 62 to base station 60 to increase throughput. Alternatively Transport Buffers 34, 36, 38 and 40 originally planned for RF Interface Module 54 might be re-routed to RF Interface Module 56 and sent through base station 66 onto another Wireless Network 72 instead. As shown in the flowcharts of FIG. 7 and FIG. 8. It is the monitoring of feedback, the management of RF Interface Modules 52, 54, 56 and 58 that helps to provide the Buffer Management and Transport Controller 28 its unique ability to keep high throughput when delivering Transport Buffers 34, 36, 38 and 40.

A major role of the Buffer Management and Transport Controller 28 is the ability to manage decisions around utilizing all attached RF Interface Modules 52, 54, 56 and 58. Delivery to the Data Transmission Control and Re-assemble component 46 can proceed more smoothly with a greater number of RF Interface Modules 52, 54, 56 and 58. In this embodiment the Data Transmission Control and Re-assembly component 46 has a greater responsibility as it must connect to each supported Wireless Network 70, 72 and 74 and re-assemble packets from all three networks. These links will deliver datagrams from each of the RF Interface Modules 52, 54, 56 and 58 which will be re-assembled in order based on the sequence numbers placed into each datagram by the Buffer Management and Transport Controller 28.

Figure 3:
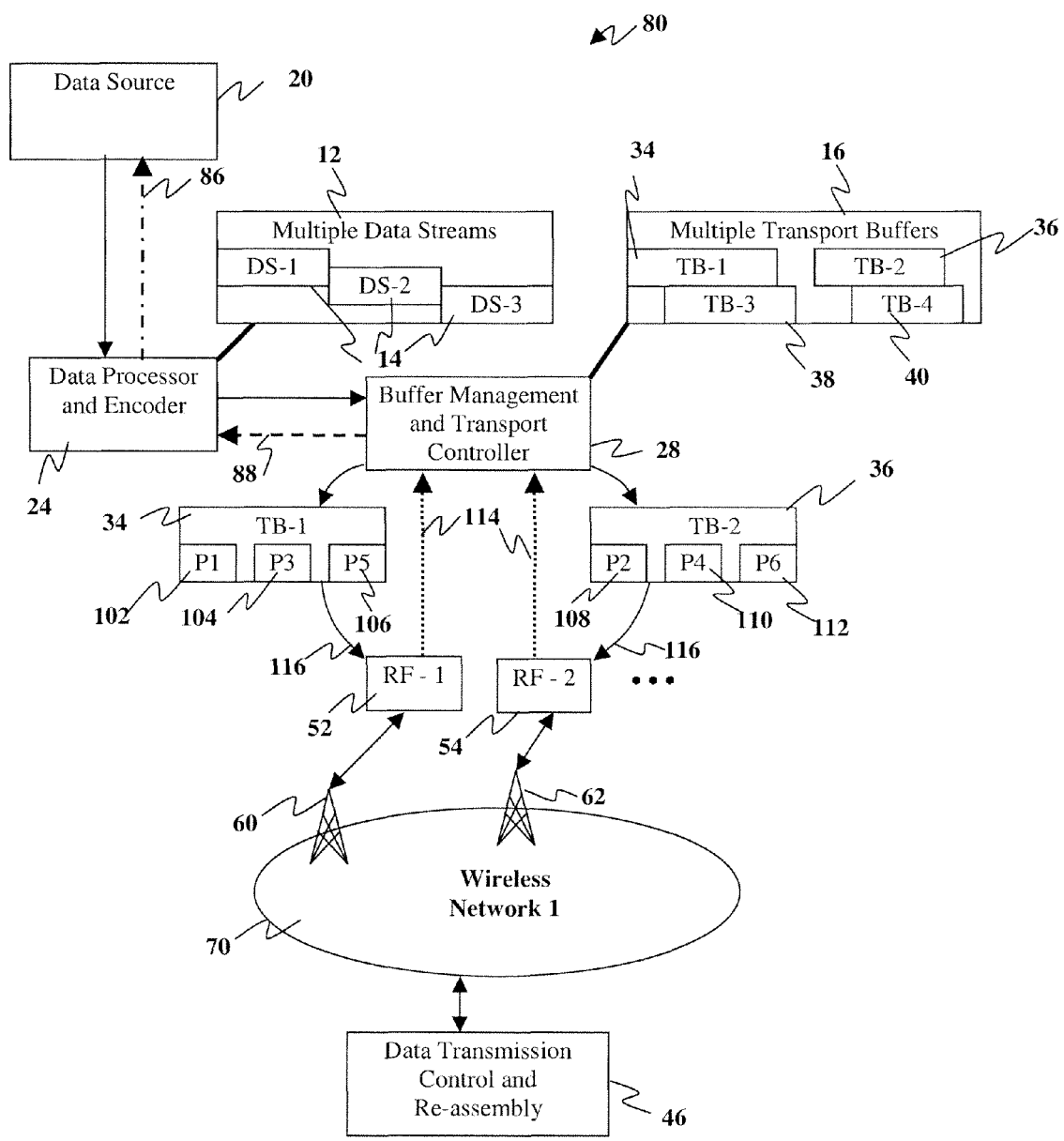
FIG. 3 is a block diagram of an exemplary system showing delivery of transport buffers using feedback mechanisms.

FIG. 3 is a block diagram of an exemplary system 80 showing delivery of transport buffers 16 using feedback mechanisms. The embodiments discussed extend to an environment where additional wireless networks are also supported. FIG. 3 also provides greater detail on the exchange of both control information 114, 88 and 86 and Transport Buffers 16 between the components of the system.

Within the Buffer Management and Transport Controller 28 each Transport Buffer TB-1 (34), TB-2 (36), TB-3 (38) and TB-4 (40) are composed of data portions (P), shown in TB-1 as P1 (102), P3 (104) and P5 (106). If the data being exchanged was audio and video data then these data portions could be individual frame segments, or a collection of frame segments. If the data being exchanged was multimedia data then it could also be individual pictures, gestures or some other digital data. The data portions make up a part of the original Data Streams (DS) 14 coming from the Data Processor and Encoder 24. In this illustration the odd numbered Portions 102, 104 and 106 are part of Transport Buffer 1 (TB-1) 34 and even numbered Portions 108, 110 and 112 are part of Transport Buffer 2 (TB-2) 36. These are sent respectively to RF Interface Module 1 (RF-1) 52 and RF Interface Module 2 (RF-2) 54. Other RF Interface Modules could be present, but for simplicity only two RF interface modules 52 and 54 are illustrated.

As Transport Buffers (34 and 36) are delivered via links 116 to RF Interface Modules 52 and 54 respectively, feedback information 114 is provided to the Buffer Management and Transport Controller 28 from RF-1 (52) and RF-2 (54). This information includes, for example, Receive Signal Strength Indicator (RSSI), transmit collisions at the base station 60 and 62, coverage drop-off indicators, time between successful transmission attempts, current available bandwidth, as well as historical information tabulated from pervious readings. This feedback information assists the Buffer Management and Transport Controller 28 to determine the best means for delivering additional buffers to follow. The selection of each subsequent Transport Buffer (TB) 38 and 40 to be given to all available RF Interface Modules 52 and 54 is made based on as much feedback information 114 as can be gathered by the RF Interface Modules 52 and 54. In this system the ability to feedback relevant status information about base station conditions improves the overall performance of the system to give intelligence to the Buffer Management and Transport Controller 28.

Additional options are also possible in an exemplary system to deal with feedback 114 from RF Interface Modules 52 and 54. For example if the feedback 114 indicated very serious congestion and a systemic inability to deliver information then additional throttling feedback 88 could be given to the Data Processor and Encoder 24. In this exemplary embodiment the Data Processor and Encoder 24 has additional functionality added to deal with any feedback 88 given. This feedback might have several effects, such as limiting the number of Data Streams (DS) 14 sent to the Buffer Management and Transport Controller 28. With future advanced Data Source equipment, such as high-end production cameras, the Data Processor and Encoder 24 might have the option of sending a control signal 86 to a more advanced Data Source 20 to reduce the quality and quantity of information being sent. In the example of a production camera this advanced Data Source 20 might be able to change the picture resolution dynamically, or perhaps inform the user of the Data Source 20 equipment that a change in setting is required. This measured feedback mechanism through the Buffer Management and Transport Controller 28 can be programmatically determined based on parameters such as buffer sizes, high water and low water thresholds and other such well known algorithms.

Figure 4:
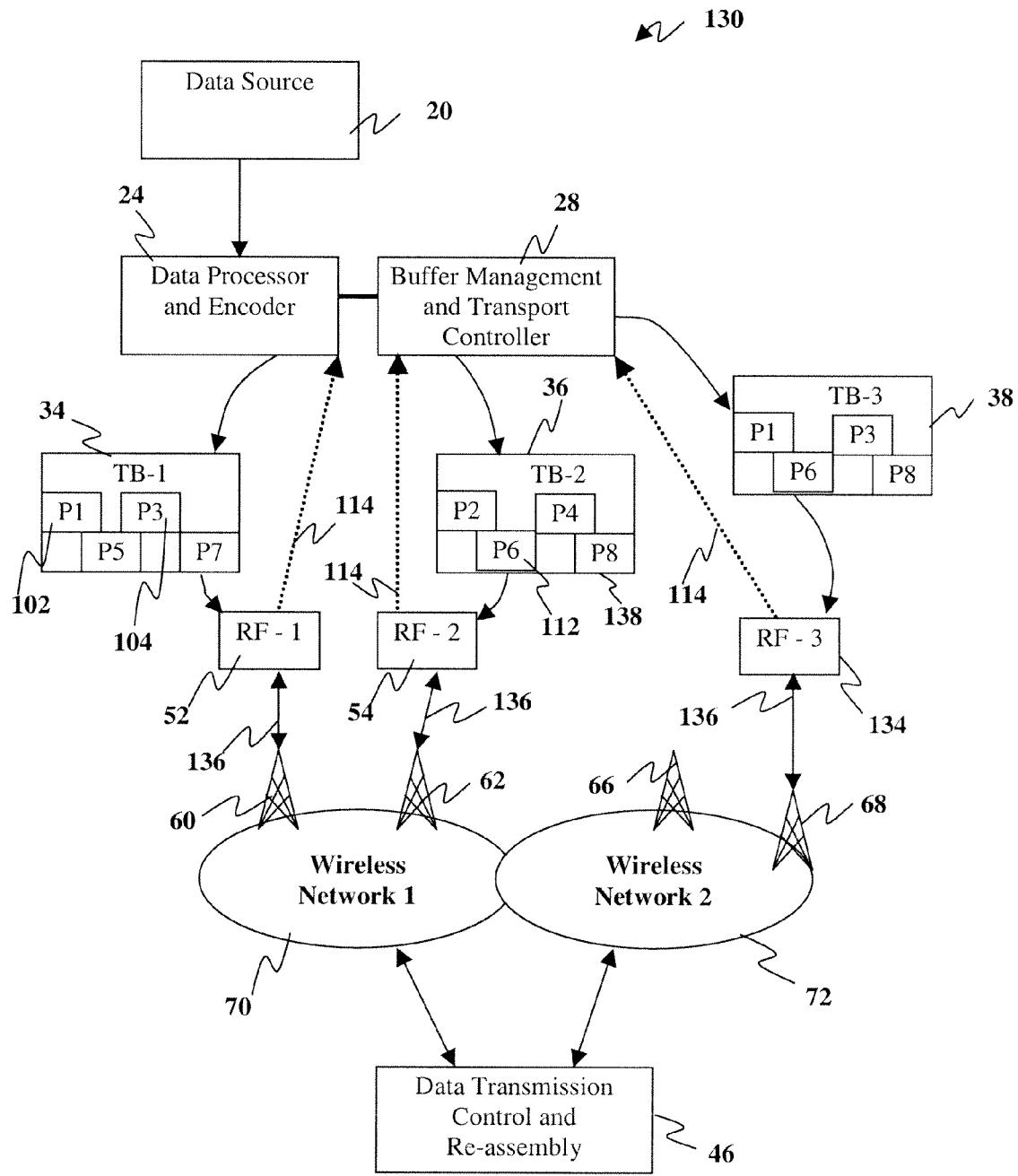
FIG. 4 is a block diagram of an exemplary system showing delivery of transport buffers over multiple wireless networks using feedback mechanisms.

FIG. 4 is a block diagram of an exemplary system 130 showing delivery of transport buffers 34, 36 and 38 over multiple wireless networks 70 and 72 using feedback mechanisms. In this embodiment the number of Wireless Networks 70 and 72 is greater than the system illustrated in FIG. 3. The number of RF Interface Modules 52, 54 and 134 is also greater to make use of the additional wireless networks. The selection of two wireless networks and three RF Interface Modules is arbitrary and could far exceed the number shown in this illustration.

In FIG. 4 the Buffer Management and Transport Controller 28 has utilities to use the additional RF Interface Module 134 to further improve the reliability of delivering Transport Buffers (TB) 34, 36 and 38. As feedback 114, is received from all RF Interface Modules 52, 54 and 134 the Buffer Management and Transport Controller 28 will be able to determine which wireless links 136 and wireless networks 70 and 72 are performing well or poorly. Given the wide range of encoding methods available to the Buffer Management and Transport Controller 28 it is possible to prioritize some Data Portions (102, 104, 112 and 138) as more important than others. These more important Data Portions (102, 104, 112 and 138) could be considered essential to reassembling the data. In the example of audio and video data being encoded, these data portions could be considered the essential picture quality to assemble any image whatsoever, while other Data Portions could be considered high definitions components and are therefore less essential. In this example the Buffer Management and Transport Controller 28 replicates these Data Portions (102, 104, 112 and 138) within Transport Buffer 3 (TB-3) 38 and sends them to RF-3 (134) for wireless transmission. In the event that the Data Transmission Control and Re-assembly component 46 receive duplicate frames there are well known methods to detect and delete the duplicates. By adding additional logic and intelligence within the Data Transmission Control and Re-assembly component 46, additional links to wireless networks and duplicate detection can be added. If the essential Data Portions within Transport Buffer 1 (34) and Transport Buffer 2 (36) are lost in transmission then the redundant transmission of those Data Portions within Transport Buffer 3 (38) will ensure their arrival.

Figure 5:
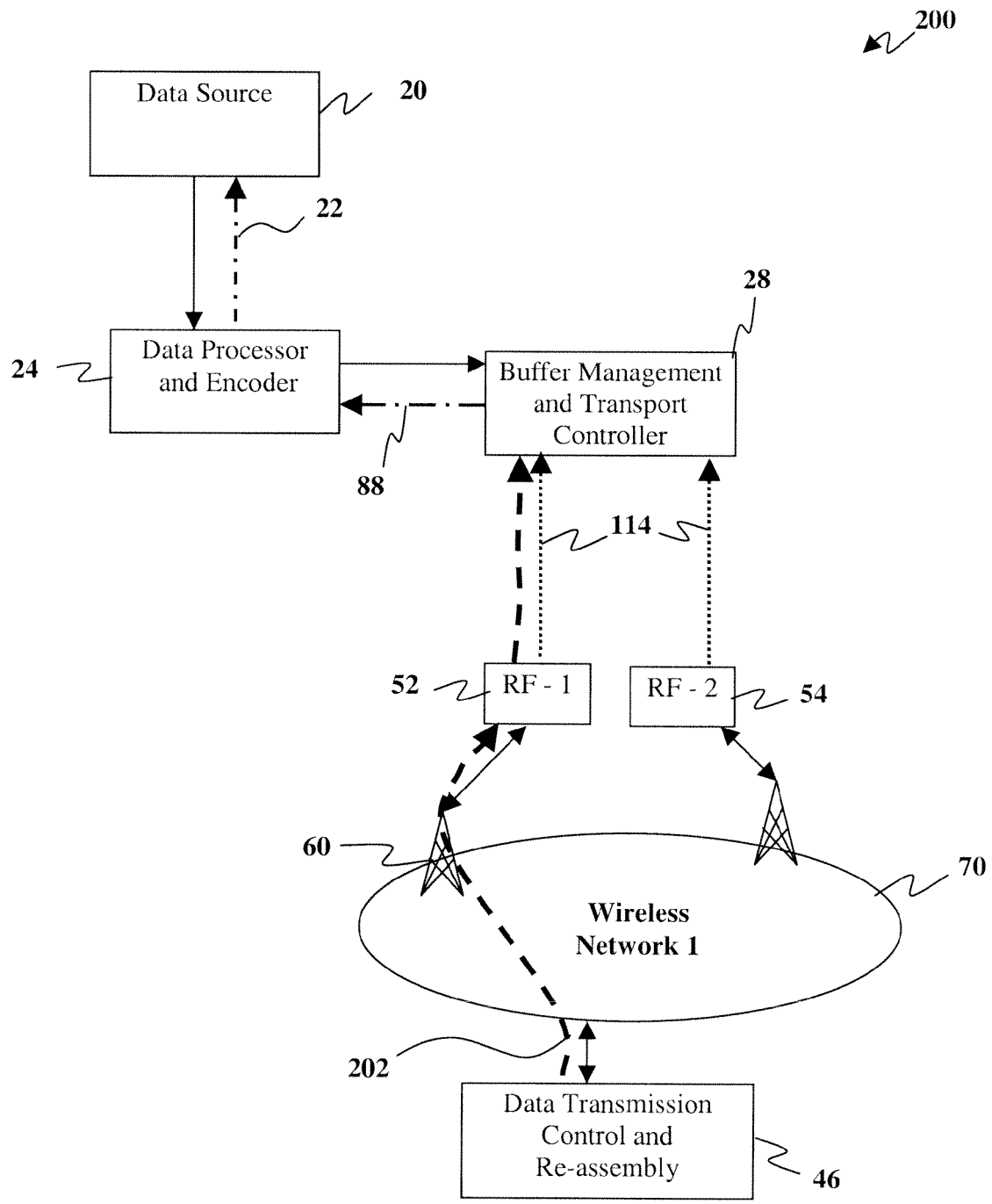
FIG. 5 is a block diagram of an exemplary system showing additional feedback mechanisms.

FIG. 5 is a block diagram of an exemplary system showing additional feedback mechanisms. In this Figure the feedback 114 from RF Interface Modules 52 and 54 are still available, but it is augmented with feedback information 202 coming from the Data Transmission Control and Re-assembly 46 component. This additional feedback 202 can be used to carry information about successful delivery of Transport Buffers 34, 36 and 38, it can carry information about how long it took each Transport Buffer 34, 36 and 38 to arrive (i.e. latency in the system) and many other characteristics about the reception of Transport Buffers 34, 36 and 38. This information can be dealt with at the Buffer Management and Transport Controller 28 or additional signals 88 can be sent back to the Data Processor and Encoder 24. The Data Processor and Encoder 24 can then send feedback control signals 22 to the Data Source 20 to limit the quantity and quality of the information being sent.

In a wireless environment feedback from a range of sources will improve complex logic that must be made when sending large amounts of time critical digital information. The Buffer Management and Transport Controller 28 will only improve its success rate of Transport Buffers 34, 36 and 38 delivered with each new piece of information provided to it.

Figure 6:
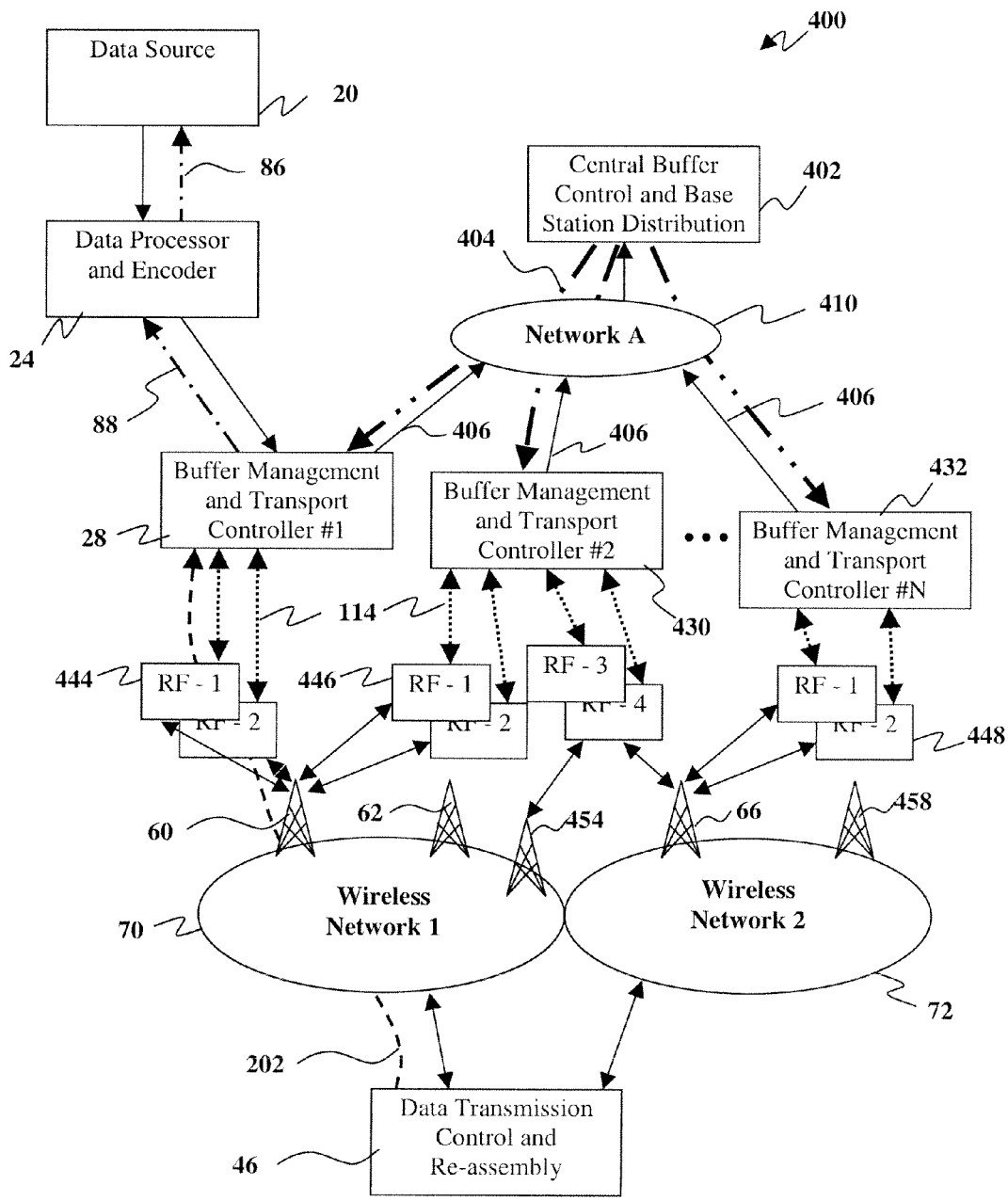
FIG. 6 is a block diagram of an exemplary system showing multiple occurrences of buffer management and transport controllers working over multiple networks with a central controller providing additional feedback mechanisms.

FIG. 6 is a block diagram of an exemplary system 400 showing multiple occurrences of buffer management and transport controllers working over multiple wireless networks such as 460 and 462 with a central controller 402 providing additional feedback mechanisms. In a complex system where there exist multiple wireless networks such as 460 and 462, and multiple occurrences of the system being used, the system allows for additional feedback 404 mechanism to further assist with the delivery of Transport Buffers such as 444, 446 and 448. Due to the volume of information that must be transmitted from Buffer Management and Transport Controllers 412, 430 and 432 it must be recognized that serious loads will be placed upon base stations 450, 452, 454, 456 and 458 located across one or more Wireless Networks 460 and 462. Although five base stations are shown over two wireless networks, these are limitations of the illustration and do not represent real limitations. The nature of large quantities of data such as normal definition and high definition audio and video requires many advanced methods to be undertaken to ensure success in the overall system 400. As the number of installed and working systems in a given region increase they will require a Central Buffer Control and Base Station Distribution 402 component to assist in improving the overall system 400.

In system 400 as Buffer Management and Transport Controller #1, #2 and #N (412, 430 and 432) receive feedback information 114 and 202 it is acted upon, but also routed as feedback information 406 to the Central Buffer Control and Base Station Distribution 402 component. If feedback information 202 is not present then only 114 is used from each RF Interface Module 444, 446 and 448. The ability to couple the Buffer Management and Transport Controllers 28, 430 and 432 to the Central Buffer Control and Base Station Distribution 402 component is managed through a wide-area Network A 410. This Network A could be a well-known network such as the Internet or it could be a private IP network. Connection into this network could be wired or wireless, for example a WiFi access point running in conjunction with the Internet or some other combination.

The resulting effect of having the Central Buffer Control and Base Station Distribution 402 component overseeing the system allows actions to be taken between different Buffer Management and Transport Controllers 412, 430 and 432 that could not have been done previously. For example the Central Buffer Control and Base Station Distribution 402 component could detect that base station 450 is reaching a saturation point and request that RF Interface Module 446 move its connection to base station 452 that is underutilized. These kinds of oversight decisions allow the system to be better balanced and allow it to provide additional control in the system to improve the throughput of Transport Buffers 16.

FIG. 7 provides a flow chart illustrating the flow of data from the mobile source to the destination. The data information is received from a data source and encoded into the selected type of data stream at step 502. When the data source is a video source it could be high definition (HD) broadcast quality data from a digital camera, some other direct source, or stored information that has originally created from a direct source. Other sources could include multimedia data, logging data and any form of data that is produced in large quantities that has a time critical aspect to the information. Depending on the data type, it can be encoded using many techniques to reduce the volume wherever possible. In the case where a video stream is being encoded, it is possible to follow one of many encoding methods that include compression, such as MPEG-4 and Multiple Descriptive Coding (MDC) discussed earlier.

This data stream is then encoded into transport buffers (TBs) at step 504, based on a variety of parameters which are stored for eventual transmission. Some of these parameters include the number of available RF Interface Modules for transmission, the feedback from each of the RF Interface Module, the type of redundancy that is required for the data based on the number of available RF Interface Modules. Storage of transport buffers in a storage area provides some lag time in the arrival of the transport buffers, but allows for dynamically changing wireless delivery conditions to be dealt with more effectively.

The feedback information from all sources is interpreted to make RF Interface Module choices at step 506. Feedback information such as base station identifier, Receiver Signal Strength Indicator (RSSI), dramatic RSSI changes, sender bandwidth, receiver bandwidth, calculated throughput based on a time interval, instant throughput with delay at receiver versus sender, highest bandwidth sent per link, and average packet loss per link. Other feedback can include the total number of RF Interface Modules across all instances of the system running in a given region, as provided by the Central Buffer Control and Base Station Distribution 402 component. For example if the total number of RF Interface Modules on a specific base station exceeds a high-water mark, then one or more RF Interface Modules associated with that base station, could be requested to move base stations, or the amount of data being given to the one or more RF Interface Modules could be reduced. Alternatively or additionally if the Central Buffer Control and Base Station Distribution 402 component detects that the number of total RF Interface Modules across a given Wireless Network is too great it could provide this total number to each of the Buffer Management and Transport Controllers 412, 430 and 432. Based on a programmed parameterization this total number of RF Interface Modules could signal that a change in throughput is required for a given set of RF Interface Modules. Alternatively or additionally the Central Buffer Control and Base Station Distribution 402 could provide a value for the total amount of transmitted data through one specific Wireless Network. Based on a programmed behavior, or based on parameterization, the Buffer Management and Transport Controllers 412, 430 and 432 might decide that this total value has reached a high-water mark and that more data must be moved to another Wireless Network to relieve the strain on the saturated Wireless Network.

The interpretation of the feedback can result in a determination of whether all attached RF Interface Modules are being given too much data to transmit at step 508. If the data is not a problem a check is performed at step 512 to determine if a previous command was sent to reduce the amount of data being sent at step 512. If the amount of data has been restricted and the restriction is no longer required a command is sent to the Data Processor and Encoder 24 and possibly the Data Source 20 to increase the amount of data being processed, at step 518.

If the RF Interface Modules are receiving too much data then a command can be sent to the Data Processor and Encoder 24 at step 510 to reduce the amount of Data Stream information. A check is then made at step 514 to see if the data source 20 can receive a command to reduce information. If it can, then a command is sent to the data source 20 at step 516 to reduce the quality and quantity of information to be encoded.

After these adjustments are made to the system a Transport Buffer is pulled from memory and sent to the correct RF Interface Module based on the programmed logic, the feedback that has been processed and any parameters that have been set by the user at step 520. Parameters could include high and low watermarks for each attached RF Interface Module, the maximum saturation of transmitted data through a given Wireless Network based upon total transport buffers transmitted.

FIG. 8 is a flow chart illustrating the flow of data to determine which paths to use for delivery it to a destination. This more detailed flow chart expands the logic within steps 506 and 508 of FIG. 7.

At step 602 there are many elements of state information that can be examined to determine the best course of action. The examinations that follow at steps 604, 610, 620 and 630 are a subset to represent the types of detailed behaviors that can be examined for. This state information may include internal state information (such as the size of current buffer levels), external state information (such as feedback from the RF Interface Modules), and Central Buffer Control Information (such as the overall saturation of a given base station across all occurrences of the invention).

Examination step 604 examines the current RSSI value from a given RF Interface Module. The RSSI value can be used in many ways. A straightforward high water and low water mark could be used to determine at this point in time if an RF Interface Module is maintaining good coverage with the currently attached base station. A historical metric could be used to determine if the RSSI value has changed too dramatically from the last RSSI value provided by an RF Interface Module? Several RSSI levels could be averaged to determine if there is a negative trend that indicates a pending failure. Whatever technique is used the RSSI is a very useful feedback element from the RF Interface Module to determine what is happening if the RF link to the base station and hence to the Wireless Network.

At step 606, if the RSSI value is a concern then the amount of Transport Buffer information given to this RF Interface Module is reduce. A flag is then set at step 608 to indicate the RSSI value for this RF Interface Module is a concern and processing moves to step 610.

If the RSSI value wasn't a concern, or after setting an RSSI concern flag, a check is performed on the current transmit buffer level at step 610. This internal value could be used to indicate that the buffer for this RF Interface Module is being drained too slowly compared to a preconfigured rate of usage. This rate could also be seen as the rate at which the buffer is being emptied compared to how quickly it is being filled. If this transmit buffer exhaustion rate falls below a determined value then the number of transport buffer being given to a specific RF Interface Module is reduced at step 612. The buffer level bad flag is set for this RF Interface Module at step 614 and the processing proceeds to step 620.

If the buffer rate was not a concern, or after setting the buffer rate with a bad flag, a check is performed on the packet loss per connection at step 620. This calculated value could be performed in several ways. For example, the number of transmit attempts through a given RF Interface Module could be compared to a success rate. The number of base station collisions when transmitting could be compared to the number of transmits attempted. When too many collisions occur on an average amount of transmit attempts it usually indicates that the base station is getting saturated and is not keeping up. If the packet loss per RF Interface Module connection is too high then the number of transport buffers given to this RF Interface Module is reduced at step 622. A packet loss problem flag is set and processing moves to step 60.

If the packet loss rate was not a problem, or after setting the packet loss flag, a check is performed on any feedback given by the Central Buffer Control and Base Station Distribution 402 component. There are many types of feedback the Central Buffer Control and Base Station Distribution 402 could provide, in this example it may check for warnings about base station saturation levels at step 630. The Central Buffer Control and Base Station Distribution 402 has a wider overview of the system, as feedback as to the status of each RF Interface Module is collected. If a warning has been provided then the number of transport buffers given to an RF Interface Module is reduced at step 632. Then the base station too busy flag is set and the logic returns to check for addition state information.

Other possible checks include the total number of active connections and changes to those connections. Looking at the uptime per connection and comparing that to the amount of time the RF Interface Module is actually considered out of coverage and number to communicate with the base station. Looking at the throughput per connection based on feedback from the destination receiver could also be examined. This feedback could also have the time delay or latency for transmitting a transport buffer through a given wireless network. Current state information could also include GPS location data, and the time of day. Time of day information could allow for checks on peek and busy periods of the day, allowing certain RF Interface Modules to avoid heavier transmissions in certain dense downtown regions during peek periods. Overall sustainable bandwidth can also be determined based on data transmit per RF Interface Module averaged per second or minute.

Once all possible state informational elements are examined, an overall count of the number of flags set is performed at step 640. This check could be done on one RF Interface Module, or across all RF Interface Modules. Some programmed or configured high-water mark might have to be reached in order to take the bigger step of reducing the amount of data to be encoded into transport buffers at the source. If the number of flags set was too high then processing moves to step 642 where a flag is set to reduce data at the source. Processing then moves to step 510 of FIG. 7. The reduce data at source flag will be used later when it might be necessary to turn on full data flow once again. If the number of flags set were not too high then processing proceeds to 512 of FIG. 7, where the flag will be checked and the amount of data being set may be increased.

Although the invention has been described with reference to certain specific embodiments, various modifications thereof will be apparent to those skilled in the art without departing from the spirit and scope of the invention as outlined in the claims appended hereto.

We claim:

1. A system comprising:
a buffer management and transport controller configured to divide encoded data streams into data portions for buffering into multiple transport buffers;
a plurality of radio frequency modules configured to wirelessly transmit the data portions simultaneously to a plurality of different wireless networks to aggregate throughput across the plurality of different wireless networks, wherein the plurality of radio frequency modules are further configured to provide network feedback to the buffer management and transport controller regarding network conditions for the plurality of different wireless networks;

a data transmission control and reassembly configured to receive the data portions from the plurality of different wireless networks for reassembly and to provide receiver feedback to the buffer management and transport controller regarding additional network conditions for the plurality of different wireless networks;

wherein the buffer management and transport controller is further configured to use the network feedback and the receiver feedback to, for each data portion and prior to transmission of the data portion over at least one of the plurality of different wireless networks, withdraw the data portion from a transport buffer and dynamically select a radio frequency module of the plurality of radio frequency modules for the transmission of the data portion over the at least one of the plurality of different wireless networks;

wherein the buffer management and transport controller is configured to dynamically select a first wireless network for transmission of a first data portion, and a second different wireless network for transmission of a second data portion such that different data portions are transmitted to different wireless networks; and wherein the buffer management and transport controller is configured to match a buffering rate for the data portions with a withdraw rate for the data portions using the network feedback and the receiver feedback.

2. The system of claim 1, wherein the network feedback and the receiver feedback comprises an error rate for each radio frequency module based on data portions that are not delivered at the destination for re-assembly; and a capacity condition for each radio frequency module based on at least one of a latency for transmission of the data portions and data portions that are delivered at the destination for re-assembly.

3. The system of claim 1, wherein:
the data portions withdrawn from the buffer management and transport controller are assembled packets of datagrams having respective sequence numbers that are delivered to the dynamically selected radio frequency module; and
the delivered assembled packets from each radio frequency module are re-assembled at the destination using the sequence numbers in the corresponding datagrams.

4. The system of claim 1, further comprising a data source configured to:
capture audio-visual data for the encoded data streams; and
use the network feedback and the receiver feedback to control at least one of the quantity and the quality of the captured audio-visual data.

5. The system of claim 1, wherein the buffer management and transport controller is controlled by a second buffer management and transport controller that is configured to control:
the withdrawal by the buffer management and transport controller of the data portions;
the dynamic selection of the radio frequency modules for the transmission of the data portions; and
the transmission by selected radio frequency modules to simultaneously available different wireless networks.

6. The system of claim 1, further comprising an encoder for encoding data streams, wherein the encoded data streams comprise redundant information to be delivered for increased reliability as the data portions from each radio frequency module for the wireless radio transmission to the plurality of different wireless networks for re-assembly at a destination.

7. The system of claim 1, wherein the network feedback and the receiver feedback is selected from a group consisting of:
latency for transmission of data portions;
transmit collisions at the plurality of different wireless networks;
the number of the radio frequency modules in the wireless radio transmission with each of the plurality of different wireless networks;
throughput requirements of the plurality of radio frequency modules for the wireless radio transmission on each of the plurality of different wireless networks;
coverage drop-off indicators;
time between successful transmission attempts;
status values;
Received Signal Strength Indicator (RSSI);
packet retransmissions;
average packet loss per link;
sender bandwidth;
destination bandwidth;
current available bandwidth; and
combinations thereof.

8. The system of claim 1, wherein:
the withdrawal of encoded data portions from the buffer management and transport controller are assembled packets of datagrams having respective sequence numbers that are delivered to the selected radio frequency module;
the delivered data portions from each radio frequency module are re-assembled at the destination using the sequence numbers in the corresponding datagrams; and
the quantity at which the delivered data portions from each radio frequency modules are being re-assembled at the destination includes:
a rate at which the delivered data portions from each radio frequency modules are being re-assembled at the destination; and
an amount at which the delivered data portions from each radio frequency modules are being re-assembled at the destination.

9. The system of claim 1, wherein when the buffer management and transport controller is intermittently stationary and in motion relative to the plurality of different wireless networks, to use the network feedback and the receiver feedback, to control:
original data streams that are encoded into the buffer management and transport controller;
the withdrawal by the buffer management and transport controller of the data portions;
the dynamic selection of the radio frequency modules for the transmission of the data portions; and
the transmission by selected radio frequency modules to simultaneously available different wireless networks.

10. The system of claim 9, wherein the network feedback and the receiver feedback is selected from a group consisting of:
latency for transmission of data portions;
transmit collisions at the plurality of different wireless networks;
the number of the radio frequency modules in the wireless radio transmission with each of the plurality of different wireless networks;
throughput requirements of the plurality of radio frequency modules for the wireless radio transmission on each of the plurality of different wireless networks;

coverage drop-off indicators;
time between successful transmission attempts;
status values;
Received Signal Strength Indicator (RSSI);
packet retransmissions;
average packet loss per link;
sender bandwidth;
destination bandwidth;
current available bandwidth; and
combinations thereof.

11. The system of claim 1, wherein encoded data streams are generated from a continuous real-time stream of audio-visual data by a wireless device.

12. The system of claim 1 further comprising:
a data source configured to capture a continuous real-time stream of audio-visual data;
a converter configured to convert the captured audio-visual data into original data streams; and
an encoder configured to encode the original data streams into the encoded data streams.

13. The system of claim 12 wherein the buffer management and transport controller is configured to control the encoder based on the network feedback and the receiver feedback.

14. The system of claim 1, wherein two or more the radio frequency modules are further configured to enable said wireless radio transmission of the data portions to one of the plurality of different wireless networks.

15. The system of claim 1, wherein the buffer management and transport controller is further configured, using the network feedback and the receiver feedback, to control delivery rate of data portions to selected radio frequency modules.

16. The system of claim 1, wherein the buffer management and transport controller is further configured, using the network feedback and the receiver feedback, to dynamically and selectively redirect the data portions from radio frequency module to another radio frequency module, and from one the different wireless networks to another of the different wireless networks, whereby data throughput to the destination is maintained.

17. The system of claim 1, wherein each of the radio frequency modules is further configured to monitor and control the wireless radio transmission of the data portions, whereby data throughput to the destination is maintained.

\* \* \* \* \*